United States Patent Office 3,061,413
Patented Oct. 30, 1962

3,061,413
METHOD FOR PRODUCING OXYGEN
Gosta C. Akerlof, Princeton, N.J., assignor to FMC Corporation, a corporation of Delaware
No Drawing. Filed Nov. 16, 1959, Ser. No. 853,017
10 Claims. (Cl. 23—221)

This invention relates to the production of high purity oxygen, by the chemical reaction of a solid alkali metal peroxide with a solid compound containing a hydrogen oxide in its crystal structure, the reaction taking place in the absence of any liquid hydrogen oxide.

Heretofore, no source of high purity oxygen has been readily available which supplied relatively small quantities of oxygen at a sustained rate, conveniently, and with a minimum of bulk. This has resulted in the widespread use of bottle oxygen as the primary source for supplying small quantities of oxygen required in laboratory experiments, and in such equipment as self-contained breathing devices and combustion units. In laboratories, for example, where small but sustained quantities of oxygen are required, an oxygen tank weighing about 151 pounds plus the contained oxygen must be employed to obtain up to 20 odd pounds of oxygen gas. In addition, special reducing valves and gases must be affixed to the steel tank to obtain the oxygen at the lower pressure necessary for most uses. Also, steel tanks must be returned, involving more handling costs. Further, the general handling of heavy steel tanks is difficult and requires special moving and trucking equipment for transporting the tanks to and from the location where they are to be used.

A second, less accepted method for obtaining oxygen in small amounts has been to generate the gas by the reaction of chemical ingredients. This method has not met with any widespread acceptance because it necessitates reacting both liquid and solid ingredients under constant supervision and regulation. This regulation is required if a constant flow of oxygen is desired, since the rate at which oxygen is evolved is not fixed. These rates may vary with such factors as concentration and quantities of the chemicals being reacted. Further, the purity of the oxygen evolved is difficult to control. Additionally, the bulky reaction equipment wherein such a chemical reaction occurs, in practice necessarily restricts such a method to the laboratory.

It is an object of the present invention to provide an improved process for producing high purity oxygen, at sustained rates, by simply mixing two dry powders.

It is a further object of the invention to provide a method for producing high purity oxygen by the reaction of two dry powders, wherein the individual dry reactants are stable over extended periods of time, and thus suitable for storage.

It is a further object of the invention to produce extremely high pressures by generating oxygen from the reaction of two dry powders in an enclosed area.

These and other objects will become more apparent from the following description of the invention.

It has been unexpectedly found that when a stable alkali metal peroxide in solid form is mixed with a solid compound containing a hydrogen oxide, i.e. water or hydrogen peroxide, in its crystal structure, in the absence of any noncrystalline or liquid hydrogen oxide, a chemical reaction occurs releasing oxygen. The oxygen is evolved at a rate which is virtually independent of the pressure, and of the concentration of the alkali metal peroxide in any specified quantity of charge, but is proportional to the time elapsed and the temperature employed. The mixture of these two dry powders is capable of producing oxygen at normal room temperatures.

The term alkali metal peroxides as used in the specification and claims, refers to both normal alkali metal peroxides, e.g. $Na_2O_2$ and alkali metal superoxides, e.g. $KO_2$. The two most readily available alkali metal peroxides which have been found suitable are normal sodium peroxide ($Na_2O_2$) and potassium superoxide ($KO_2$).

It is surprising that dry crystalline compounds will react with potassium superoxide to yield highly pure oxygen at a linear rate throughout the entire reaction. This is particularly true in view of the fact that potassium superoxide, for example, forms an explosive mixture with water. On the other hand, if potassium superoxide or sodium carbonate peroxide is mixed with alcoholic sodium hydroxide no reaction occurs. If sodium carbonate peroxide is mixed with an aqueous sodium hydroxide, oxygen is liberated, but under explosive conditions and in a nonlinear fashion. Dry potassium superoxide when mixed with anhydrous sodium carbonate yields nothing. Similarly dry potassium superoxide when mixed with dry potassium hydroxide again yields nothing. It is therefore unexpected that dry potassium superoxide when mixed with dry sodium carbonate containing crystalline hydrogen oxide yields oxygen at a uniform and constant rate.

The alkali metal peroxides react at higher rates when mixed with compounds containing water in their crystal structure, as compared with compounds containing hydrogen peroxide in their crystal structure. Accordingly, compounds containing water in their crystal structure would preferably be employed where comparatively large amounts of oxygen are required within a short duration of time. Compounds having water in their crystal structure that react with the alkali metal peroxides, e.g. $KO_2$, are $NaH_2PO_4 \cdot H_2O$, $NaBO_3 \cdot 4H_2O$, $LiOH \cdot H_2O$, $BaCl_2 \cdot 2H_2O$, $Na_2HPO_4 \cdot 7H_2O$, $AlCl_3 \cdot 6H_2O$, $Al(NO_3)_3 \cdot 9H_2O$ and others. The rates of oxygen production will vary when employing these compounds containing crystalline water; however, all of these compounds will give extremely vigorous reactions, yielding large amounts of oxygen in a short time.

Compounds containing crystalline hydrogen peroxide generally react with the alkali metal peroxides much less vigorously than do their crystalline water-containing counterparts. Moreover, these crystalline hydrogen peroxide compounds react with the normal alkali metal peroxides at a much slower rate than with the alkali metal superoxides. When a normal alkali metal peroxide such as sodium peroxide ($Na_2O_2$) is reacted with a compound containing crystalline hydrogen peroxide, the quantity of oxygen obtained is relatively small, but it is evolved at a sustained rate over a long period of time.

In contrast thereto, an alkali metal superoxide, e.g. $KO_2$, reacts with compounds containing crystalline hydrogen peroxide at much higher rates than $Na_2O_2$, and certain precautions in the selection of the components hereinafter described must be observed to prevent the formation of explosive mixtures. These explosive mixtures are believed due to the dissolution of the crystalline peroxide compound in water produced by the oxygen forming reaction, and also in the presence of KOH formed by the same reaction. The result is the breaking down of the peroxide crystal lattice, as this compound dissolves into water. The hydrogen peroxide in an aqueous phase reacts at a much faster rate than in a solid crystalline surface phase. Therefore, excessive release of oxygen from $KO_2$ and explosive decomposition of the hydrogen peroxide may occur.

The present reactions may be represented by the following equations:

$$4KO_2 + 4Na_2CO_3 \cdot 3H_2O_2 \rightarrow 4KOH + 10H_2O + 9O_2\uparrow + 4Na_2CO_3$$

$$Na_2O_2 + Na_2CO_3 \cdot 3H_2O_2 \rightarrow 2NaOH + 2H_2O + 2O_2\uparrow + Na_2CO_3$$

$$4KO_2 + 5NaH_2PO_4 \cdot H_2O \rightarrow 4KOH + 3H_2O + 3O_2\uparrow + 5NaH_2PO_4$$

The reactions proceed at temperatures of about 0° C., but very slowly. At room temperatures, the rates are generally satisfactory, and may be accelerated by raising the temperature. The logarithm of the reaction rate appears to vary linearly with the inverse absolute temperature.

In order for the reactions to proceed to completion, a sufficient amount of the compound containing crystalline water or hydrogen peroxide must be present to convert all the alkali metal peroxide to the alkali metal hydroxide. If insufficient amounts of the compound containing crystalline peroxide or water are present in the mixture, the reaction will proceed until all of the crystalline-containing peroxide or water is consumed. Thereafter unreacted alkali metal peroxide and the compound which contained the crystalline water or hydrogen peroxide remain without reacting any further.

Compounds containing water of hydration react at uniform rates with both normal peroxides and superoxides. However, the employment of vigorously reacting alkali metal superoxides as the primary oxygen source with crystalline hydrogen peroxide compound necessitates using crystalline hydrogen peroxide compounds having special properties in order to obtain oxygen at a uniform rate throughout the entire reaction. It has been determined that compounds having hydrogen peroxide in their crystal lattice, and which have a solubility in water of no higher than about 65 percent by weight, i.e. 65 g. in 100 g. of water, react with potassium superoxide to form oxygen at a linear rate, without forming explosive mixtures. Compounds meeting this requirement have been found to be suitable for reaction with either alkali metal superoxides or the slower reacting normal alkali metal peroxides. Such a compound is sodium carbonate hydrogen peroxide ($Na_2CO_3 \cdot 3H_2O_2$).

While the compound containing hydrogen peroxide in its crystalline structure must conform to the water-solubility requirement given above when it alone reacts with alkali metal superoxides, it is possible to use compounds which do not meet this solubility requirement, provided they are mixed with either another compound, similarly containing hydrogen peroxide in its crystal lattice, whose final reaction product takes up water as water of hydration in its crystal or with a solid compound which takes up water or water of hydration in its crystal. In the latter case, the solid compound acts merely as an inert reagent which takes up water produced by the reaction, and does not enter into the reaction. Such compounds are anhydrous sodium carbonate and sodium carbonate hydrogen peroxide, which, after reacting with $KO_2$ remain as sodium carbonate containing 10 water of hydration molecules, at room temperature. At higher temperatures, only 7 water of hydration molecules are present.

It is thus apparent that while the stable normal alkali metal peroxides can be successfully reacted with most compounds containing hydrogen peroxide in its crystal lattice, the stable alkali metal superoxides due to the high rate of reaction require particular care in selecting the compound, or mixture of compounds, containing crystalline hydrogen peroxide which is to react with them. However, superoxides are preferred over the slower reacting peroxides because they yield oxygen at a much faster rate uniformly, over an extended period of time.

Among the compounds containing hydrogen peroxide in their crystal lattice which will react with the peroxides or superoxides to produce oxygen, are sodium carbonate peroxide, tetrasodium pyrophosphate peroxide, and urea peroxide.

Sodium carbonate peroxide reacts with either a normal alkali metal peroxide or an alkali metal superoxide with the evolution of oxygen at a constant linear rate. When employing the superoxide as the oxygen source, the oxygen is released at a much faster rate than when utilizing the normal peroxide. However, in either case the reaction is continuous and uniform until the last of the oxygen source is consumed without any unstability or violent reaction occurring. Similarly, when combining tetrasodium pyrophosphate peroxide with a normal alkali metal peroxide, a uniform and continuous evolution of oxygen is obtained, until the last of the normal peroxide is consumed.

When an alkali metal superoxide is used as the oxygen source instead of a normal alkali metal peroxide, and is admixed with only sodium pyrophosphate peroxide, oxygen is initially liberated at a constant rate. However, after an extended period of time, the mixture becomes unstable and a mild explosion occurs, with the release of copious amounts of oxygen.

In contrast thereto, when tetrasodium pyrophosphate peroxide is mixed with sodium carbonate peroxide or anhydrous sodium carbonate in specified quantities, hereinafter defined, its reaction with an alkali metal superoxide is very regular, and the rate of oxygen given off is constant without any danger of an explosive reaction.

If urea peroxide alone is mixed with an alkali metal superoxide, oxygen is liberated uniformly over a period of time. After this reaction has proceeded for an extended period, the mixture becomes unstable and gives up oxygen at a rapid rate, resulting in a mild explosion. In addition, some urea peroxide breaks down during the reaction and gives off ammonia. This contaminates the oxygen and renders it unsuitable where high purity is required. A more uniform reaction would be obtained if the urea peroxide were mixed with either sodium carbonate peroxide or anhydrous sodium carbonate, and the mixture reacted with an alkali metal superoxide.

Accordingly, when high purity oygen is required it is mandatory that the compound which contains the peroxide in its crystal lattice must not yield any gaseous components which would contaminate oxygen, during the reaction. A compound such as urea peroxide, unlike either sodium carbonate peroxide, or tetrasodium pyrophosphate peroxide, yields a gaseous component when reacting with an alkali metal superoxide, or normal peroxide, and therefore is unsuitable as one of the oxygen generating compounds, where high purity oxygen is desired.

The following examples are illustrative of the invention and obvious modifications may be made therefrom without departing from the scope of the invention.

EXAMPLE 1

Two reaction mixtures were made up in separate Erlenmeyer flasks, each consisting of 17.4 g. of $KO_2$ and 35.6 g. of $Na_2CO_3 \cdot 3H_2O_2$. The finely powdered ingredients were added and vigorously shaken to insure complete mixing. The Erlenmeyer flasks were connected to a gas burette provided with a leveling bulb and a comparison tube having the same dimensions, to correct for pressure. The burette and its comparison tube were enclosed in a larger glass tube to avoid errors caused by undesirable temperature changes. The Erlenmeyer flasks were immersed in a rapidly stirred water bath kept at a constant temperature using a sensitive thermo-regulator connected with an electronic relay and a coiled heater. One Erlenmeyer flask was kept at 30.8° C. while the other was kept at 47.8° C. The amount of oxygen evolved from each flask, was collected and measured.

In a similar manner, two additional reaction mixtures were made in separate Erlenmeyer flasks each consisting of 50.2 g. of $Na_2O_2$ and 90.0 g. of $Na_2CO_3 \cdot 3H_2O_2$. The finely powdered ingredients were vigorously shaken and one of the mixtures was reacted at 30.8° C., while the other one was reacted at 47.8° C. in the water baths described above. The volume of oxygen evolved from each flask was measured in the same manner as previously described, using similar equipment.

The quantities of oxygen liberated is tabulated in Table I.

EXAMPLE 2

Three reaction mixtures were made up in separate Erlenmeyer flasks, the first containing 1.78 g. of $KO_2$ and 16.02 g. of $Na_2CO_3.3H_2O_2$, which constitutes 10 weight percent $KO_2$, the second containing 6.84 g. $KO_2$ and 10.26 g. of $Na_2CO_3.3H_2O_2$, which constitutes 40 weight percent $KO_2$; and the third containing 9.29 g. $KO_2$ and 9.29 g. $Na_2CO_3.3H_2O_2$, which constitutes 50 weight percent $KO_2$. All the reactants employed were in a finely powdered state. The flasks were then connected to gas burettes and placed in a constant temperature bath maintained at 30.4° C. The gas burettes and the constant temperature bath were the same as those employed in Example 1. The amount of oxygen obtained from each of the mixtures is given in Table II.

EXAMPLE 3

A finely ground mixture consisting of 4 g. $KO_2$ and 36 g. $Na_4+P_2O_7.2H_2O_2$ was introduced into an Erlenmeyer flask, the latter being shaken vigorously to insure complete mixing. The flask was then connected to a gas burette and placed in a constant temperature bath maintained at 30.6° C. The gas burette and the constant temperature bath were the same as those employed in Example 1. The amount of oxygen released, and the rate of liberation are both given in Table III.

EXAMPLE 4

Three finely ground reaction mixtures were made up and introduced in the annular space of separate Dewar flasks, the first one containing 180 g. $Na_4P_2O_7.2H_2O_2$, 180 g. $Na_2CO_3.3H_2O_2$, and 40 g. $KO_2$, the second containing 190 g. $Na_2CO_3.3H_2O_2$, 190 g. $Na_4P_2O_7.2H_2O_2$, and 20 g. $KO_2$, and the third containing 270 g.

$Na_2CO_3.3H_2O_2$ 180 g. $Na_4P_2O_7.2H_2O_2$ and 50 g. $KO_2$. These samples have the following percentage ingredients.

|  | $Na_4P_2O_7.2H_2O_2$, weight percent | $Na_2CO_3.3H_2O_2$, weight percent | $KO_2$, weight percent |
|---|---|---|---|
| Sample 1 | 45 | 45 | 10 |
| Sample 2 | 47.5 | 47.5 | 5 |
| Sample 3 | 36 | 54 | 10 |

A wet test meter was attached to the flasks to measure the amount of oxygen liberated. The Dewar flasks were then immersed in a stirred, thermostatically controlled water bath. The temperature of the water bath in Sample 1 was maintained at 20.5° C., whereas for Samples 2 and 3 the temperature was 26° C. The amount of oxygen released, and the rate of liberation are both given in Table IV.

EXAMPLE 5

A finely ground mixture consisting of 4 g. of $KO_2$ and 6 g. of $NaH_2PO_4.H_2O$ was introduced into an Erlenmeyer flask, the latter being shaken vigorously to insure complete mixing. The flask was then connected to a gas burette and placed in a constant temperature bath maintained at 30.6° C. The gas burette and the constant temperature bath were the same ones as those employed in Example 1. The amount of oxygen released, and the rate of liberation are both given in Table V.

The rate at which oxygen is evolved depends upon the temperature of the reactants, with larger amounts of oxygen being released as the temperature rises. This is demonstrated by Example 1, where the oxygen evolution of normal sodium peroxide and potassium superoxide was measured, each of the above materials being reacted at 30.8° C. and 47.8° C. The results of Example 1 are reported in Table I.

Table I

[Temperature 30.8° C.; reagent $KO_2$]

| Time [1]: | Volume, cc. |
|---|---|
| 0.0 | 9.4 |
| 7.55 | 27.4 |
| 17.10 | 52.8 |
| 32.30 | 92.2 |

$\Delta V/\Delta T = cc./min. = 2.55$.

[Temperature 47.8° C.]

| Time [1]: | |
|---|---|
| 0.0 | 2.5 |
| 3.22 | 45.8 |
| 5.55 | 92.2 |
| 7.25 | 119.0 |
| 10.52 | 181.5 |
| 12.20 | 208.0 |

$\Delta V/\Delta T = cc./min. = 18$.

[Temperature 30.8° C.; reagent $Na_2O_2$]

| Time [2]: | |
|---|---|
| 0 | 16.0 |
| 45 | 17.4 |
| 60 | 17.7 |

$\Delta V/\Delta T = 0.032$ cc./min.

[Temperature 47.0° C.]

| Time [2]: | |
|---|---|
| 0 | 21.0 |
| 30 | 22.6 |
| 60 | 24.2 |

$\Delta V/\Delta T = 0.053$ cc./min.

[1] Min., sec.
[2] Minutes.

Table I clearly shows the increased rate of oxygen evolution at progressively higher temperatures, as well as the more rapid rate at which potassium superoxide yields oxygen as compared with sodium peroxide. Accordingly, a uniform stream of oxygen varying within wide flow rates can be obtained, by merely employing adequate temperature control and by proper choice of reactants.

The rate of oxygen evolution is virtually independent of the concentration of the superoxide, or peroxide, in the mixture. This is shown in Table II, which reports the results of reacting varying concentrations of potassium superoxide with sodium carbonate peroxide at a fixed temperature as performed in Example 2.

Table II

[Temperature 30.4° C.; $KO_2$ 10 wt. percent]

| Time (min.): | Vol., cc. |
|---|---|
| 00 | 8.8 |
| 9.10 | 29.8 |
| 17.05 | 48.9 |
| 25.45 | 71.4 |
| 43.30 | 92.4 |

$dv/dt = 2.44$.

[$KO_2$ 40 wt. percent]

| Time (min.): | Vol., cc. |
|---|---|
| 00 | 1.2 |
| 9.54 | 30.4 |
| 16.18 | 46.4 |
| 26.06 | 74.0 |
| 33.12 | 92.4 |

$dv/dt = 2.77$.

[$KO_2$ 50 wt. percent]

| Time (min.): | Vol. cc. |
|---|---|
| 00 | 1.2 |
| 8.54 | 25.0 |
| 17.30 | 48.2 |
| 26.00 | 71.8 |
| 33.30 | 92.8 |

$dv/dt = 2.74$.

It is thus seen that the rate of oxygen evolution ($dv=dt$) is virtually the same irrespective of varying superoxide concentrations, provided that the total weight of the reacting sample is maintained substantially constant.

The reaction between the alkali metal peroxide, or superoxide, and the compound containing hydrogen oxide in its crystal structure is virtually independent of pressure. Since one volume of these mixtures (having a density of about 2) may give considerably more than 200 volumes of oxygen at 760 mm. Hg, extremely high pressures can be generated in a closed system. Thus 500 grams of the mixture enclosed in a system with 1 cc. of free space would generate a pressure in the order of 50,000 atmospheres assuming the reacting mixture itself to be incompressible. The exact pressure obtained may be regulated by varying the amount of the charge. Similarly the rate of pressure increase may be controlled by regulating the temperature of the reactants.

The utilization of alkali metal superoxides for oxygen generation, as distinguished from normal alkali metal peroxides, necessitates that the compound with which it reacts, and which contains hydrogen peroxide in its crystal lattice, conform to the following requirements:

(A) If the crystalline hydrogen peroxide compound is used alone, it must have a solubility not exceeding about 65% by weight in water.

(B) If the initial crystalline hydrogen peroxide compound, e.g. $Na_4P_2O_7.2H_2O_2$, does not conform to the solubility requirements of (A), it may be used if admixed with either a second crystalline hydrogen peroxide compound whose end reaction product adds waters of hydration to the molecule, e.g. sodium carbonate hydrogen peroxide, or with a solid compound which takes up water as water of hydration in its crystal. In such cases, the second compound, e.g. sodium carbonate hydrogen peroxide, or anhydrous sodium carbonate must be present to the extent of at least one-third more, by weight, than the initial crystalline hydrogen peroxide containing compound, e.g. tetrasodium pyrophosphate peroxide.

The necessity for employing a compound which meets the solubility requirement, above delineated, is demonstrated in Example 3 wherein $KO_2$ is reacted with tetrasodium pyrophosphate hydrogen peroxide. This latter compound has a solubility exceeding 65% by weight, in water. The results of Example 3 are reported in Table III.

*Table III*

[Temperature 30.6° C.; reactants 10 wt. percent $KO_2$, $Na_4P_2O_7.2H_2O_2$]

| Time (sec.): | Volume |
|---|---|
| 0 | 4.0 |
| 155 | 11.7 |
| 368 | 21.0 |
| 945 | 43.0 |
| 12.80 | 53.5 |
| 2000 | Mild explosion |

It is thus evident that while the reaction produced oxygen at a uniform rate for a short duration, the mixture became unstable as the reaction progressed.

The necessity for the critical ratio of a mixture of crystalline hydrogen peroxide compounds, where one does not meet the solubility requirement, is demonstrated by Example 4. In this example a compound containing crystalline hydrogen peroxide which does not meet the solubility requirement, e.g. tetrasodium pyrophosphate hydrogen peroxide, was mixed in varying amounts with a second compound containing crystalline hydrogen peroxide, whose end reaction product adds waters of hydration to the molecule, e.g. sodium carbonate hydrogen peroxide, and these mixtures reacted with $KO_2$. The results of Example 4 are reported in Table IV.

*Table IV*

[Reagents—45 weight percent, $Na_2CO_3.3H_2O_2$; 45 weight percent, $Na_4P_2O_7.2H_2O_2$; 10 weight percent, $KO_2$. Total charge, 400 g.]

| Temp.—20.5° C. | | | |
|---|---|---|---|
| Time (min.) | Vol. (cc.) | Time (min.) | Vol. (cc.) |
| 0 | 0 | 203 | 5,000 |
| 10 | 500 | 227 | 5,500 |
| 31 | 1,000 | 252 | 6,000 |
| 51 | 1,500 | 291 | 7,000 |
| 70 | 2,000 | 313 | 8,000 |
| 89 | 2,500 | 320 | 8,500 |
| 110 | 3,000 | 323 | 9,000 |
| 131 | 3,500 | 329 | 9,500 |
| 153 | 4,000 | 337 | 10,000 |
| 178 | 4,500 | [1] 338 | 22,000 |

[1] Explosion.

[Reagents—47.5 weight percent, $Na_2CO_3.3H_2O_2$; 47.5 weight percent, $Na_4P_2O_7.2H_2O_2$; 5.0 weight percent, $KO_2$. Total charge 400 g.]

| Temp.—26° C. | | | |
|---|---|---|---|
| Time (min.) | Vol. (cc.) | Time (min.) | Vol. (cc.) |
| 0 | 0 | 176 | 3,500 |
| 16 | 500 | 199 | 4,000 |
| 36 | 1,000 | 215 | 4,500 |
| 60 | 1,500 | 227 | 5,000 |
| 87 | 2,000 | 242 | 6,000 |
| 118 | 2,500 | [1] 244 | 7,000 |
| 150 | 3,000 | | |

[1] Experiment interrupted to avoid uncontrolled explosion.

[Reagents—36 weight percent, $Na_4P_2O_7.2H_2O_2$; 54 weight percent, $Na_2CO_3.3H_2O_2$; 10 weight percent, $KO_2$. Total charge 500 g.]

| Temp.—26.6° C. | | | |
|---|---|---|---|
| Time (min.) | Vol. (cc.) | Time (min.) | Vol. (cc.) |
| 0 | 0 | 318 | 9,000 |
| 18 | 1,000 | 360 | 10,000 |
| 38 | 2,000 | 401 | 11,000 |
| 62 | 3,000 | 444 | 12,000 |
| 94 | 4,000 | 488 | 13,000 |
| 133 | 5,000 | [1] 1,408 | 26,000 |
| 178 | 6,000 | 1,488 | 27,000 |
| 228 | 7,000 | 1,575 | 28,000 |
| 275 | 8,000 | | |

[1] Readings continued next morning.

From the results thus shown, mixtures of $$Na_4P_2O_7.2H_2O$$

outside the critical limits established were unstable and would explode, while mixtures of $Na_4P_2O_7.2H_2O$ within the prescribed limits, produced oxygen at a uniform rate, without becoming explosive.

From the results thus shown, mixtures of $$Na_4P_2O_7.2H_2O_2$$

outside the critical limits established were unstable and would explode, while mixtures of $Na_4P_2O_7.2H_2O_2$ within the prescribed limits, produced oxygen at a uniform rate, without becoming explosive.

The reaction of an alkali metal superoxide, e.g. $KO_2$ and a compound containing water of crystallization, such as $NaH_2PO_4.H_2O$ is demonstrated in Example 5. The results of Example 5 are reported in Table V.

Table V

[Temperature 30.6° C.; reactants 4 g. $KO_2$, 36 g. $NaH_2PO_4.H_2O$]

| Time (sec.): | Vol., cc. |
|---|---|
| 0 | 0 |
| 30 | 19.2 |
| 60 | 37.2 |
| 81 | 53.0 |
| 100 | 65.0 |
| 125 | 82.5 |

The results of Table V clearly demonstrate the uniform rate at which the oxygen is liberated.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of producing oxygen at a constant rate which comprises reacting a compound selected from the group consisting of a stable, solid, normal alkali metal peroxide and a stable, solid alkali metal superoxide, with a solid inorganic salt containing crystalline hydrogen peroxide, said reaction taking place at room temperature and in the absence of a liquid selected from the group consisting of hydrogen peroxide and water, said solid inorganic salt containing crystalline hydrogen peroxide having a solubility no higher than 65% by weight in water when reacted with said solid alkali metal superoxide.

2. The method of producing oxygen at a constant rate which comprises, reacting a stable, solid alkali metal superoxide with a solid inorganic salt containing hydrogen peroxide in its crystalline structure, said solid inorganic salt containing hydrogen peroxide in its crystalline structure and having a solubility of no higher than 65% by weight in water, said reaction taking place in the absence of a liquid selected from the group consisting of hydrogen peroxide and water.

3. A method of producing oxygen at a constant rate which comprises, reacting a stable solid alkali metal superoxide with a mixture comprising a first solid inorganic salt containing hydrogen peroxide of crystallization and a second inorganic salt which takes up water as water of hydration in its crystalline structure, said second solid inorganic salt being present to the extent of at least one third more by weight than said first solid inorganic salt, said reaction taking place in the absence of a liquid selected from the group consisting of hydrogen peroxide and water.

4. The method of claim 1 wherein the alkali metal peroxide is an alkali metal superoxide.

5. The method of claim 1 wherein the alkali metal peroxide is a normal alkali metal peroxide.

6. The method of claim 1 wherein the alkali metal peroxide is sodium peroxide, and the inorganic salt containing crystalline hydrogen peroxide is sodium carbonate hydrogen peroxide.

7. The method of claim 1 wherein the alkali metal peroxide is sodium peroxide and the inorganic salt containing crystalline hydrogen peroxide is tetrasodium pyrophosphate hydrogen peroxide.

8. The method of claim 1 wherein the alkali metal peroxide is potassium superoxide and the inorganic salt containing crystalline hydrogen peroxide is sodium carbonate hydrogen peroxide.

9. The method of producing oxygen at a constant rate which comprises reacting potassium superoxide with a mixture of tetrasodium pyrophosphate hydrogen peroxide and sodium carbonate hydrogen peroxide, said sodium carbonate hydrogen peroxide being present to the extent of at least one third more by weight than the tetrasodium pyrophosphate, said reaction taking place in the absence of any liquid water.

10. A method of producing oxygen at a constant rate which comprises reacting a stable, solid, alkali metal superoxide with a mixture comprising a first solid inorganic salt containing hydrogen peroxide of crystallization and a second solid inorganic salt containing hydrogen peroxide of crystallization, said second inorganic salt being present to the extent of at least one-third more by weight than said first inorganic salt, said second inorganic salt upon reaction with said solid alkali metal superoxide forming reaction products which add water of hydration to their molecules, said reaction of said alkali metal superoxide and said mixture of first and second solid inorganic salts taking place in the absence of a liquid compound selected from the group consisting of hydrogen peroxide and water.

References Cited in the file of this patent

UNITED STATES PATENTS

| 1,000,298 | Sarason | Aug. 8, 1911 |
| 1,379,221 | Scott et al. | May 24, 1921 |
| 2,517,209 | Jackson et al. | Aug. 1, 1950 |

OTHER REFERENCES

Turner in "American Chem. Jr.," vol. 37, page 106, 1907.

Friend et al.: "Textbook of Inorganic Chemistry," vol. VII, part I, 1924, pages 330–334.

Parkington: "Textbook of Inorganic Chemistry," 6th Edition, copyright 1950, page 194.

UNITED STATES PATENT OFFICE
CERTIFICATE OF CORRECTION

Patent No. 3,061,413                                October 30, 1962

Gosta C. Akerlof

It is hereby certified that error appears in the above numbered patent requiring correction and that the said Letters Patent should read as corrected below.

Column 5, line 63, for "6 g." read -- 36 g. --; column 7, line 1, for "(dv=dt)", in italics, read -- (dv/dt) --; in italics; line 29, for "requirements" read -- requirement --; line 57, for "12.80" read -- 1280 --; column 9, line 49, before "inorganic" insert -- solid --.

Signed and sealed this 18th day of June 1963.

(SEAL)
Attest:

ERNEST W. SWIDER
Attesting Officer

DAVID L. LADD
Commissioner of Patents